UNITED STATES PATENT OFFICE.

GEORGE WELTDEN GESNER, OF NEW YORK, N. Y., ASSIGNOR TO HARLESTON CORBETT GESNER, OF SAME PLACE.

MANUFACTURE OF ELECTRICAL CONDUCTORS.

SPECIFICATION forming part of Letters Patent No. 651,033, dated June 5, 1900.

Application filed December 19, 1899. Serial No. 740,937. (No specimens.)

*To all whom it may concern:*

Be it known that I, GEORGE WELTDEN GESNER, a citizen of the United States, and a resident of New York, in the borough of Brooklyn and State of New York, have invented a new and useful manufacture of electrical conductors—such as conductors generally, telephone-contacts, dynamo-brushes, arc-light electrodes, and incandescent filaments—of an alloy of iron and hydrogen, the hydrogen being present in such quantity as to prevent the action of all oxidizing agents, including that arising from chlorin, and the alloy being of much less specific gravity than any metal now used therefor, of which the following is a specification.

The manufacture of the alloy is generally disclosed in a pending application for patent of mine, filed March 10, 1896, Serial No. 582,600; also, in Letters Patents No. 604,580, dated May 24, 1898, and No. 642,320, dated January 30, 1900, and also in additional pending applications filed December 13, 1899, Serial No. 740,153, and December 15, 1899, Serial No. 740,415. These applications and patents disclose in detail the alloy and processes and apparatus for making the same.

It will suffice in the present case to state that the alloy of iron and hydrogen is produced from iron ore, steel, manufactured scrap or any other iron, and hydrogen. The association or combination of the hydrogen is stable under all conditions of heat. The alloy is of about half the weight of iron. It resists oxidation that might be induced through any cause.

The alloy is produced by exposing the iron in a converter at a temperature of about 1,800° to an atmosphere of hydrogen, generated by steam injected into the converter from a steam-boiler through a coil of iron pipe constituting the hydrogen-generator and heated either in a separate furnace or in the furnace in which the alloy is made. Another mode of producing the alloy is to expose scrap-iron to hydrogen in the converter and remove the scale formed upon it by stirring-bars inserted through the converter side, afterward grinding and screening such scale to remove any unalloyed iron, and then either fusing it in a crucible or upon open hearth into ingots and drop-forging or rolling them. Another mode is to force the hydrogen through the molten metal and then to remove the alloy that has been formed from the unalloyed iron either by puddling and squeezing or by grinding and sifting. Another mode is direct from iron ore.

These applications describe the apparatus, process, and product claimed, and relate to the commercial manner of making and manipulating the alloy of iron and hydrogen, and mention its valuable qualities, which consist, chiefly, in its resistance to oxidation and corrosion from heat or chemical action, arising from either atmospheric or more powerful influences.

By the term "oxidation" I include the oxidizing action of chlorin on metals and metallic compounds.

I claim as my invention—

1. An electrical conductor of an alloy of iron and hydrogen, the hydrogen being present in such proportion as to prevent the oxidation or corrosion of the iron in said alloy.

2. An electrical conductor of an alloy of iron and hydrogen, the hydrogen being present in the proportion of about eleven one-hundredths of one per cent. in the alloy.

In testimony that I claim the invention as above set forth I affix my signature in the presence of two witnesses.

GEORGE WELTDEN GESNER.

Witnesses:
WM. H. MCGRANN,
BERTHA L. DANA.